(12) United States Patent
Bailey et al.

(10) Patent No.: US 6,638,650 B1
(45) Date of Patent: Oct. 28, 2003

(54) METHOD AND APPARATUS FOR DETECTING TRANSFER LEAKS IN FUEL CELLS AND FUEL CELL STACKS

(75) Inventors: Ross W. J. Bailey, Vancouver (CA); David P. Wilkinson, North Vancouver (CA); Stephen A. Campbell, Maple Ridge (CA)

(73) Assignee: Ballard Power Systems Inc., Burnaby (CA)

( * ) Notice: Subject to any disclaimer, the term of this patent is extended or adjusted under 35 U.S.C. 154(b) by 103 days.

(21) Appl. No.: 09/677,104

(22) Filed: Sep. 29, 2000

(51) Int. Cl.[7] ................................................. H01M 8/00
(52) U.S. Cl. .............................. 429/13; 429/30; 429/12
(58) Field of Search .............................. 429/38, 39, 34, 429/35, 30, 13, 23, 25, 22

(56) References Cited

U.S. PATENT DOCUMENTS 6,156,447 A  * 12/2000 Bette et al. .................... 429/13

FOREIGN PATENT DOCUMENTS

WO    WO 00/39870    *  7/2000   ............ H01M/8/00

* cited by examiner

*Primary Examiner*—Stephen Kalafut
*Assistant Examiner*—Raymond Alejandro
(74) *Attorney, Agent, or Firm*—McAndrews, Held & Malloy, Ltd.

(57) ABSTRACT

A method of detecting transfer leaks within a solid polymer electrolyte fuel cell stack comprising a plurality of fuel cell assemblies includes supplying reactants and inert gas to the fuel, oxidant and/or coolant manifolds of the stack, as appropriate, and measuring the voltage across at least one of the fuel cell assemblies. An apparatus for detecting transfer leaks within solid polymer electrolyte fuel cell stacks comprises a device for measuring the voltage across at least one of the fuel cell assemblies. Transfer leaks across the polymer electrolyte membrane, and across reactant-coolant bipolar plates, may be detected according to the present method and apparatus.

35 Claims, 4 Drawing Sheets

METHOD AND APPARATUS FOR DETECTING TRANSFER LEAKS IN FUEL CELLS AND FUEL CELL STACKS

FIELD OF THE INVENTION

The present invention relates to methods and apparatus for detecting transfer leaks in solid polymer electrolyte fuel cells and locating such cells in fuel cell stacks.

BACKGROUND OF THE INVENTION

Electrochemical fuel cells convert reactants, namely fuel and oxidant, to generate electric power and reaction products. Electrochemical fuel cells generally employ an electrolyte disposed between two electrodes, namely a cathode and an anode. The electrodes each comprise an electrocatalyst disposed at the interface between the electrolyte and the electrodes to induce the desired electrochemical reactions.

Solid polymer fuel cells employ a solid polymer electrolyte, or ion exchange membrane. The membrane is typically interposed between two electrode layers, forming a membrane electrode assembly ("MEA"). The membrane is typically proton conductive and acts as a barrier, isolating the fuel and oxidant streams from each other on opposite sides of the MEA. The MEA is typically interposed between two plates to form a fuel cell assembly. The plates act as current collectors, provide support for the adjacent electrodes, and typically contain flow field channels for supplying reactants to the MEA or circulating coolant. The fuel cell assembly is typically compressed to ensure good electrical contact between the plates and the electrodes, as well as good sealing between fuel cell components. A plurality of fuel cell assemblies may be combined electrically, in series or in parallel, to form a fuel cell stack. In a fuel cell stack, a plate may be shared between two adjacent fuel cell assemblies, in which case the plate also separates the fluid streams of the two adjacent fuel cell assemblies. Such plates are commonly referred to as bipolar plates and may have flow channels for directing fuel and oxidant, or a reactant and coolant, on each major surface, respectively.

The fuel fluid stream which is supplied to the anode may be a gas such as, for example, substantially pure gaseous hydrogen or a reformate stream comprising hydrogen, or a liquid such as, for example, aqueous methanol. The fuel fluid stream may also contain other fluid components such as, for example, nitrogen, carbon dioxide, carbon monoxide, methane, and water. The oxidant fluid stream, which is supplied to the cathode, typically comprises oxygen supplied as, for example, substantially pure gaseous oxygen or a dilute oxygen stream, such as, for example, air, which may also contain other components such as nitrogen, argon, water vapor, carbon monoxide, and carbon dioxide. Various sealing mechanisms are used to fluidly isolate the fuel and oxidant streams from one another in the fuel cell.

The electrochemical reactions in a solid polymer fuel cell are generally exothermic. Accordingly, a coolant is typically also needed to control the temperature within a fuel cell assembly to prevent overheating. Conventional fuels cells employ a liquid, such as, for example, water to act as a coolant. In conventional fuel cells, the coolant stream is fluidly isolated from the reactant streams.

Thus, conventional fuel cells typically employ three fluid streams, namely fuel, oxidant, and coolant streams, which are fluidly isolated from one another. See U.S. Pat. No. 5,284,718 and FIGS. 1, 2A and 2B of U.S. Patent No. 5,230,966, for examples of typical fuel cell assemblies configured to fluidly isolate the aforesaid three fluid streams. Each of the foregoing '718 and '966 patents is incorporated herein by reference in its entirety. Fluid isolation is important for several reasons. For example, one reason for fluidly isolating the fuel and oxidant streams in a hydrogen-oxygen fuel cell is that hydrogen and oxygen are particularly reactive with each other. Accordingly, in solid polymer fuel cells an important function of the membrane and plates is to keep the fuel supplied to the anode separated from the oxidant supplied to the cathode. The membrane and plates are, therefore, substantially impermeable to hydrogen and oxygen. However, since the membrane also functions as an electrolyte, the membrane is generally permeable to protons and water. (Water is generally required for proton transport in membrane electrolytes.)

The coolant fluid is preferably isolated from the reactant fluids to prevent dilution and contamination of the reactant streams. Furthermore, in a conventional fuel cell, it is undesirable to mix a liquid coolant, such as water, with a gaseous reactant such as hydrogen or oxygen. Water may cause flooding in the reactant fluid passages, which prevents the reactants from reaching the electrochemically active membrane-electrode interface. It is also undesirable for the reactant streams to leak into the coolant stream because this reduces operating efficiency, as the leaked reactants are not used to generate electrical power. Likewise, leakage of any of the fluids to the surrounding atmosphere is generally undesirable.

There are several conventional methods of detecting leaks. For example, in a hydrogenoxygen fuel cell, the oxidant exhaust stream can be monitored to detect the presence of hydrogen. When hydrogen is detected in the oxidant exhaust stream, this may indicate a leak. A problem with this method is that hydrogen may be present in the oxidant exhaust stream for reasons other than a leak. For example, if there is a shortage of oxygen at the cathode, protons arriving at the cathode from the anode may recombine with electrons to form hydrogen. There are many possible causes for such an oxygen shortage. For example, an oxygen shortage may result from a sudden increase in power output demand, a malfunctioning compressor, a blockage in fluid flow field channels caused by an accumulation of product water, or a clogged air filter. An oxygen shortage may result in complete or partial oxygen starvation resulting in a reduction in cell voltage and the production of hydrogen by the recombination of protons with electrons on the cathode side of the fuel cell.

An additional problem with using a constituent such as hydrogen, other reactants, or reaction products, as an indicator of a leak is that these constituents may be reactive within the fuel cell. These constituents may be particularly reactive in the presence of the electrocatalyst at the interfaces between the electrolyte and the anode and cathode. Consequently, these substances may react partially or completely prior to being exposed to a detector located in the fluid exhaust manifold. Thus, the concentration of any detected substances may not accurately reflect the amount of the constituent substance that is leaking and may delay the detection of a leak.

When the fuel stream comprises carbon dioxide, a method of detecting leaks between the fuel and oxidant fluid streams involves detecting greater than a threshold level of carbon dioxide in the oxidant exhaust stream. A disadvantage of this method is that an oxidant supply stream, such as air, may already comprise carbon dioxide in varying concentrations. This may be especially true in vehicular applications where the oxidant intake may receive air comprising the exhaust streams of other vehicles. Therefore, a disadvantage of this method is that, for reliable operation, it is necessary to measure the carbon dioxide concentration in the oxidant intake stream, as a reference, in addition to measuring the carbon dioxide concentration in the oxidant exhaust stream.

Another method of detecting leaks between the fuel and oxidant fluid streams is to measure the oxygen concentration in the fuel exhaust stream. Like the aforementioned methods, a problem with this method is that there are other potential sources of oxygen at the anode. For example, sometimes oxygen is introduced into fuel reformate supply streams to counter the effects of catalyst poisoning. Another source of oxygen at the anode is water that may be converted to oxygen, electrons, and protons at the anode when there is a shortage of fuel (which is referred to as fuel starvation). Therefore, a disadvantage of these oxygen detection methods is that other parameters must be analyzed to determine when the oxygen measured within the fuel exhaust stream is the result of fuel starvation, a leak, or residual oxygen that was added to the fuel supply stream.

Fuel cells are also typically checked for leaks prior to operating the fuel cell to produce power, for example, after assembly or during routine maintenance. Another method of checking for leaks is to introduce a gas into the inlet of one of the fluid passages while the outlet is sealed. The other fuel cell fluid passage inlets are sealed and the outlets are typically fluidly connected to a bubble tube. The volume of any gas that bubbles through the bubble tube is measured to determine if there is any leakage. A problem with this test is that it is difficult to administer with consistent results and the test is a time consuming one. Also, particularly with respect to the reactant fluid passages, the pressurization of only one reactant fluid passage may result in damage to the thin membrane electrolyte layer and/or other fuel cell components.

Further, in the foregoing methods it may not be possible to easily and reliably determine which fuel cell(s) in the stack are leaking, if a leak is detected. Thus, it is often necessary to disassemble the stack and re-test it in sections until each leaking cell is found. Such a time-intensive, iterative process is less than desirable.

Accordingly, there is a need for a simple and reliable method of detecting a leak in a fuel cell stack. There is a need for a method that provides a rapid indication of a leak and that can identify the fuel cell or cells that are leaking.

SUMMARY OF THE INVENTION

A method of detecting transfer leaks within a fuel cell stack is provided. The stack comprises a plurality of solid polymer electrolyte fuel cell assemblies, at least one fuel manifold fluidly connected thereto, and at least one oxidant manifold fluidly connected to the fuel cell assemblies. In one embodiment the method comprises:
(a) supplying fuel to the fuel manifold(s) at a first pressure;
(b) supplying oxidant to the oxidant manifold(s) at a second pressure; and
(c) measuring the voltage across at least one of the fuel cell assemblies.

The first pressure may be greater than or equal to the second pressure, or the first pressure may be less than the second pressure.

Another embodiment of the present method comprises:
(a) supplying fuel to the fuel manifold(s) at a first pressure;
(b) supplying an inert gas to the oxidant manifold(s) at a second pressure lower than the first pressure; and
(c) measuring the voltage across at least one of the fuel cell assemblies.

In yet another embodiment of the present method, the fuel cell assemblies further comprise a membrane electrode assembly comprising an anode, a cathode, and an ion exchange membrane interposed therebetween, and the fuel cell stack further comprises coolant stream passages in thermal communication with at least a portion of the fuel cell assemblies and at least one coolant manifold fluidly connected to the coolant stream passages.

The embodiment of the present method comprises:
(a) supplying fuel to the fuel manifold(s) at a first pressure;
(b) supplying oxidant to the oxidant manifold(s) at a second pressure;
(c) supplying a gas to the coolant manifold(s) at a third pressure; and
(d) measuring the voltage across at least one of the fuel cell assemblies,
wherein the gas is selected from the group consisting of oxidant and an inert gas, and wherein the third pressure is greater than the first pressure, the second pressure, or both. The first pressure or the second pressure, but not both, may be greater than or equal to the third pressure.

In yet another embodiment, the present method comprises:
(a) supplying oxidant to the oxidant manifold(s) at a first pressure;
(b) supplying a gas to the fuel manifold(s) at a second pressure;
(c) supplying fuel to said at least one coolant manifold(s) at a third pressure; and
(d) measuring the voltage across at least one of the fuel cell assemblies,
wherein the gas is selected from the group consisting of fuel, oxidant and an inert gas, and wherein the third pressure is greater than the first pressure, the second pressure, or both. The first pressure may be greater than or equal to the third pressure. Where the gas is fuel, the second pressure may be greater than or equal to the third pressure.

Yet another embodiment of the present method comprises:
(a) supplying a first gas to the oxidant manifold(s) at a first pressure;
(b) supplying a second gas to the fuel manifold(s) at a second pressure;
(c) supplying fuel to the coolant manifold(s) at a third pressure; and
(d) measuring the voltage across at least one of the fuel cell assemblies,
wherein the first gas is an inert gas and the second gas is selected from the group consisting of fuel and an inert gas, and wherein the third pressure is greater than the first pressure, the second pressure, or both. The first pressure or the second pressure, but not both, may be greater than or equal to the third pressure.

A further embodiment of the present method comprises:
(a) supplying an inert gas to the oxidant manifold(s) at a first pressure;
(b) supplying fuel to the fuel manifold(s) at a second pressure;
(c) supplying oxidant to the coolant manifold(s) at a third pressure; and (d) measuring the voltage across at least one of the fuel cell assemblies, wherein the third pressure is greater than the first pressure, the second pressure, or both. The first pressure or the second pressure, but not both, may be greater than or equal to the third pressure.

Yet another embodiment of the present method comprises:
(a) supplying fuel to the coolant manifold(s) at a first pressure;
(b) supplying a gas to the oxidant manifold(s) at a second pressure; and
(c) measuring the voltage across at least one of the fuel cell assemblies, wherein the gas is selected from the group consisting of oxidant and an inert gas. The first pressure may be greater than or equal to the second pressure.

Still another embodiment of the present method comprises:
(a) supplying oxidant to the coolant manifold(s) at a first pressure;
(b) supplying fuel to the fuel manifold(s) at a second pressure; and
(c) measuring the voltage across at least one of the fuel cell assemblies.

The first pressure may be greater than or equal to the second pressure.

In the present method, the stack may be operating at open circuit voltage. The method may also further comprise comparing the measured voltage with a reference voltage.

The pressure differentials between the various gases supplied to the stack may be any suitable pressure differential. For example, the pressure differential may be between 0 kPa and about 200 kPa, and preferably may be between about 6.5 kPa and about 35 kPa.

An apparatus for detecting transfer leaks within a fuel cell stack is also provided. In one embodiment, the present apparatus comprises:
(a) a fuel source fluidly connected to the fuel manifold(s) for supplying fuel thereto at a first pressure;
(b) a gas source fluidly connected to the oxidant manifold(s) for supplying a gas thereto at a second pressure; and
(c) at least one device for measuring the voltage across at least one of the fuel cell assemblies, wherein the gas supplied to the oxidant manifold(s) is selected from the group consisting of oxidant and inert gas.

In another embodiment, the present apparatus comprises:
(a) a fuel source fluidly connected to the fuel manifold(s) for supplying fuel thereto at a first pressure;
(b) an oxidant source fluidly connected to the oxidant manifold(s) for supplying oxidant thereto at a second pressure;
(c) a gas source fluidly connected to the coolant manifold(s) for supplying a gas thereto at a third pressure; and
(d) at least one device for measuring the voltage across at least one of the fuel cell assemblies, wherein the gas supplied to the coolant manifold(s) is selected from the group consisting of oxidant and an inert gas. The oxidant source and first gas source may be the same or different.

Yet another embodiment of the present apparatus comprises:
(a) an oxidant source fluidly connected to the oxidant manifold(s) for supplying oxidant thereto at a first pressure;
(b) a gas source fluidly connected to the fuel manifold(s) for supplying a gas thereto at a second pressure;
(c) a fuel source fluidly connected to the coolant manifold(s) for supplying fuel thereto at a third pressure; and
(d) at least one device for measuring the voltage across at least one of the fuel cell assemblies, wherein the gas supplied to the fuel manifold(s) is selected from the group consisting of fuel, oxidant and inert gas. Where the gas is fuel, the fuel source and gas source may be the same or different. Similarly, where the gas is oxidant the oxidant source and gas source may be the same or different.

A further embodiment of the present apparatus comprises:
(a) a first gas source fluidly connected to the oxidant manifold(s) for supplying a first gas thereto at a first pressure;
(b) a second gas source fluidly connected to the fuel manifold(s) for supplying a second gas thereto at a second pressure;
(c) a fuel source fluidly connected to the coolant manifold(s) for supplying fuel thereto at a third pressure; and
(d) at least one device for measuring the voltage across at least one of the fuel cell assemblies, wherein the first gas is an inert gas and the second gas is selected from the group consisting of fuel and inert gas. Where the second gas is fuel, the fuel source and second gas source may be the same or different. Similarly, where the second gas is an inert gas, the first gas source and second gas source may be the same or different.

A still further embodiment of the present apparatus comprises:
(a) an inert gas source fluidly connected to the oxidant manifold(s) for supplying inert gas thereto at a first pressure;
(b) a fuel source fluidly connected to the fuel manifold(s) for supplying fuel thereto at a second pressure;
(c) an oxidant source fluidly connected to the coolant manifold(s) for supplying oxidant thereto at a third pressure; and
(d) at least one device for measuring the voltage across at least one of the fuel cell assemblies.

Another embodiment of the present apparatus comprises:
(a) a fuel source fluidly connected to the coolant manifold(s) for supplying fuel thereto at a first pressure;
(b) a gas source fluidly connected to the oxidant manifold(s) for supplying a gas thereto at a second pressure; and
(c) at least one device for measuring the voltage across at least one of the fuel cell assemblies, wherein the gas supplied to the oxidant manifold(s) is selected from the group consisting of oxidant and inert gas.

Yet another embodiment of the present apparatus comprises:
(a) an oxidant source fluidly connected to the coolant manifold(s) for supplying oxidant thereto at a first pressure;
(b) a fuel source fluidly connected to the fuel manifold(s) for supplying fuel thereto at a second pressure; and
(c) at least one device for measuring the voltage across at least one of the fuel cell assemblies.

In the present apparatus, the device for measuring the voltage across at least one of the fuel cell assemblies may be removably attached to the stack. Further, the device may generate an output signal representative of the measured voltage, in which case the apparatus may further comprise a voltage display for receiving the output signal from the device.

A further embodiment of the present apparatus comprises: a device(s) for measuring the voltage across at least one of the fuel cell assemblies of a fuel cell stack, and for generating an output signal representative of the measured voltage; and, a voltage display for receiving the output signal from the device(s). The stack may be adapted to receive the device(s), and the device(s) may be removably attachable to the stack. The apparatus may further comprise at least one connector for fluidly connecting a fuel source, an oxidant source, or both, to at least one of the fuel, oxidant, and coolant manifolds of the stack. The embodiment may optionally further comprise an inert gas source fluidly connected to the fuel manifold, the oxidant manifold, or both, of the stack.

In the present method and apparatus, the inert gas may be selected from the group consisting of nitrogen, argon, helium, and carbon dioxide.

DETAILED DESCRIPTION OF PREFERRED EMBODIMENT(S)

As used in this description and in the appended claims, "fuel" means a substantially pure hydrogen gas stream or a gas stream comprising hydrogen, such as a reformate gas stream, for example, and "oxidant" means a substantially pure oxygen gas stream or a gas stream comprising oxygen, such as air, for example. A "transfer leak" refers to a condition where reactants may mix with each other or with coolant within a fuel cell during normal operation due to a defect in an MEA, flow field plate(s), and/or the seals therebetween. More specifically, a "reactant transfer leak" means a transfer leak where fuel and oxidant may mix. Typical sources of reactant transfer leaks include, for example, a hole in the membrane of the MEA or a cracked fuel-oxidant bipolar flow field plate. A "fuel-to-coolant transfer leak" means a transfer leak where fuel and coolant may mix and an "oxidant-to-coolant transfer leak" means a transfer leak where oxidant and coolant may mix. These terms are not confined to transfer leaks that introduce fuel or oxidant into coolant pathways; they include transfer leaks where coolant leaks into fuel pathways and/or oxidant pathways. Typical sources of fuel-to-coolant and oxidant-to-coolant transfer leaks include, for example, cracked fuel-coolant bipolar flow field plates and cracked oxidant-coolant bipolar flow field plates, respectively. "Reactant-to-coolant transfer leak" refers to fuel-to-coolant and oxidant-to-coolant transfer leaks generically. "Inert gas" means a gas stream comprising a gas that is substantially unreactive in the fuel cell stack, such as nitrogen, argon, helium, or carbon dioxide, or any combination thereof, for example. "Critical pressure" refers to the pressure differential across the membrane or MEA or fuel cell assembly that is likely to cause damage thereto. The actual value for the critical pressure will likely vary depending on membrane, MEA, fuel cell and/or stack architecture, for example, but may easily be determined for any given application. Open circuit voltage ("OCV") conditions means the voltage obtained when reactants are supplied to the fuel cells but no external electrical load is connected to the fuel cell stack.

The present method and apparatus allow solid polymer electrolyte fuel cells in a fuel cell stack to be checked for transfer leaks prior to operating the fuel cell to produce power, for example, after assembly or during routine maintenance.

Figure 1:
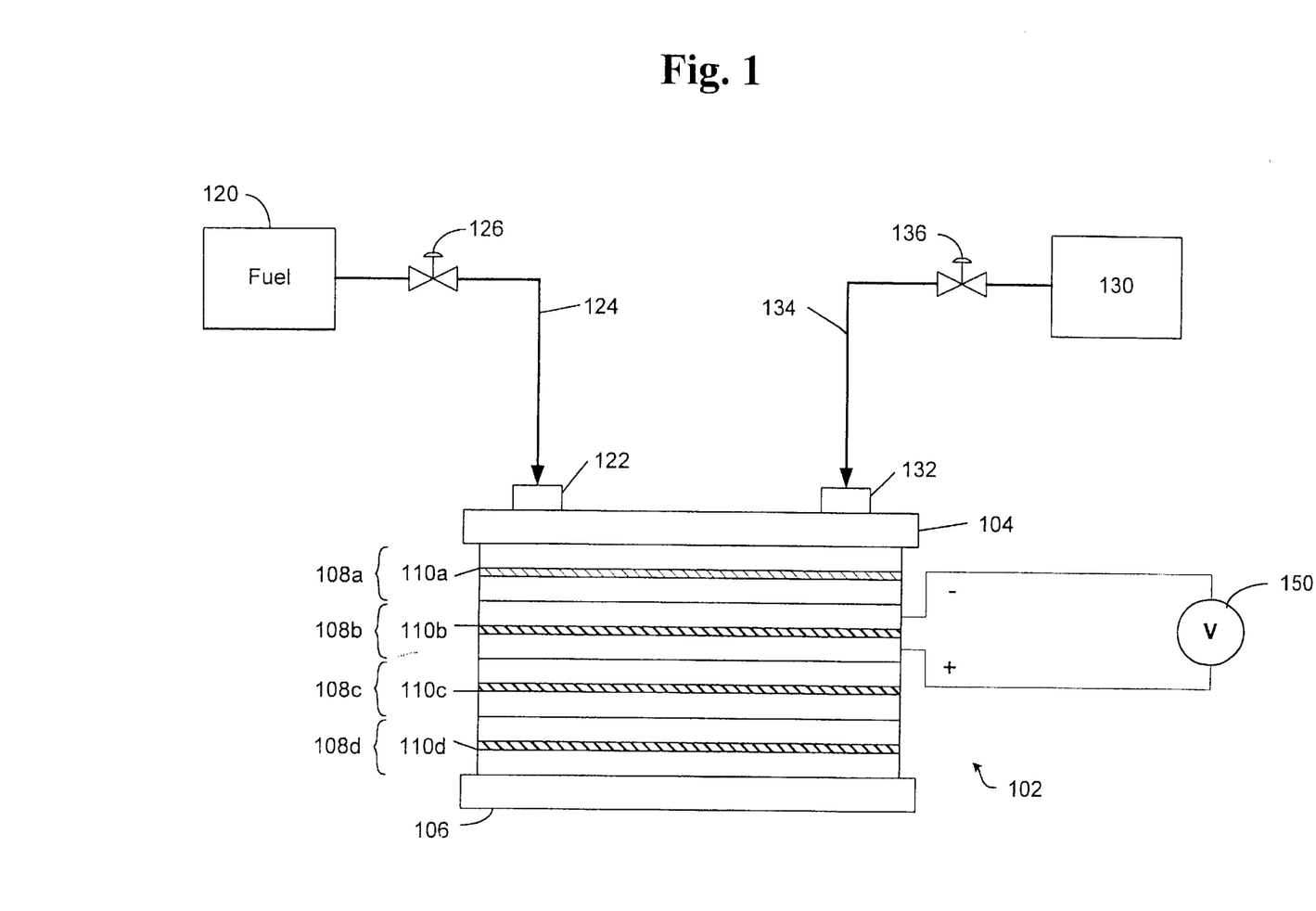
FIG. 1 is a schematic illustration of embodiments of the present apparatus.
Figure 2:
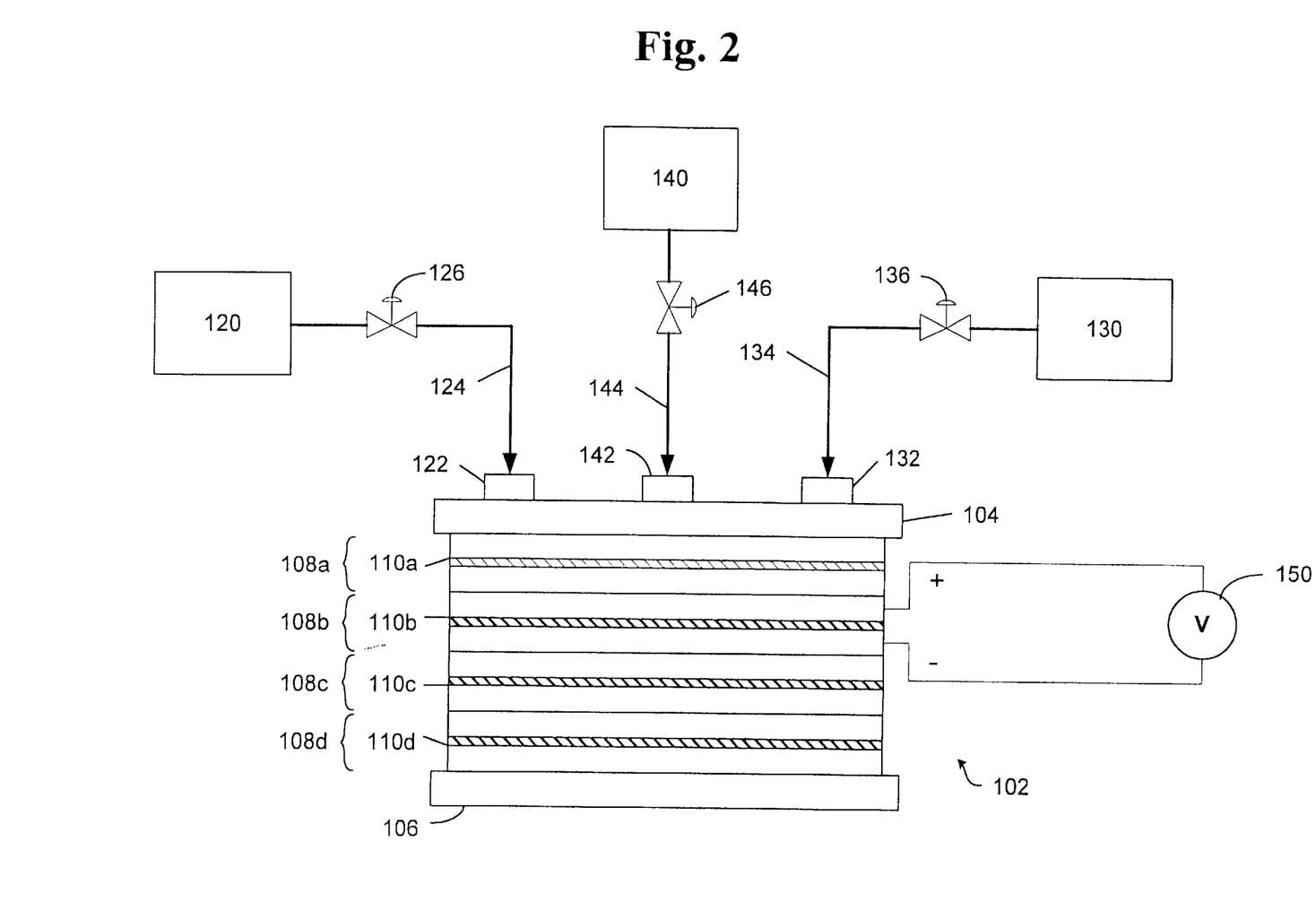
FIG. 2 is a schematic illustration of other embodiments of the present apparatus.

FIGS. 1 and 2 are schematic illustrations of embodiments of the present apparatus. Fuel cell stack 102 comprises top and bottom end plates 104 and 106, respectively, and fuel cells 108*a*, 108*b*, 108*c*, 108*d*. Stack 102 is shown with four fuel cells for illustration purposes only—the number of fuel cells in stack 102 will depend upon the application, although a typical fuel cell stack will contain tens to hundreds of fuel cells. Fuel cells 108*a*, 108*b*, 108*c*, 108*d* comprise ion exchange membranes 110*a*, 110*b*, 110*c*, 110*d*, respectively. Gas source 120 is removably connected to fuel inlet manifold 122 via line 124 to supply a gas stream to stack 102. Pressure valve 126 regulates the pressure of the gas stream supplied to stack 102. Similarly, gas source 130 is removably connected to oxidant inlet manifold 132 via line 134 to supply a gas stream to stack 102. Pressure valve 136 regulates the pressure of the gas stream supplied to stack 102. Voltmeter 150 may be connected to any of the fuel cells of stack 102 for measuring the voltage thereof. As illustrated in FIGS. 1 and 2, voltmeter 150 is connected to measure the voltage of fuel cell 108*b*. The embodiments of the present apparatus illustrated in FIG. 2 further comprise a gas supply 140 removably connected to coolant inlet manifold 142 via line 144 for supplying a gas stream to stack 102, wherein pressure valve 146 regulates the pressure of the gas stream supplied thereto. Gases supplied to stack 102 are exhausted via corresponding exhaust manifolds (not shown). Further particulars of the embodiments of the present apparatus illustrated in FIGS. 1 and 2 will be discussed below.

In a fuel cell with fuel and oxidant in the anode and cathode compartments, respectively, the cell voltage is determined by the difference in Nernstian electrode potentials leading to a cell voltage of around 1 volt (V). If a pressure differential between the reactants is established a reactant transfer leak may result in the presence of both reactants at either the anode or cathode. If this occurs, a mixed potential at that electrode results. Similarly, a reactant-to-coolant leak may result in the presence of both reactants, or a reactant and inert gas, at the electrode, producing a mixed potential (as discussed below). This mixed potential will vary between 0 V and 1 V, depending upon the relative concentrations of the reactants. As a result of the mixed potential at the affected electrode, the overall cell voltage will decrease as the magnitude of the transfer leak increases.

In an embodiment of the present method and apparatus for detecting reactant transfer leaks, fuel is supplied to the fuel manifold of the stack at a first pressure ($P_F$) and oxidant is supplied to the oxidant manifold at a higher pressure ($P_O$), such that a pressure differential in favor of the oxidant is maintained (in other words, $P_O > P_F$). As used throughout this description, $P_F$ refers to the pressure of fuel, oxidant, inert gas or other gas supplied to the fuel manifold, $P_O$ refers to the pressure of fuel, oxidant, inert gas or other gas supplied to the oxidant manifold, and $P_C$ refers to the pressure of fuel, oxidant, inert gas or other gas supplied to the coolant manifold. The pressure differential is preferably below the critical pressure for the fuel cells in the stack. For example, the pressure differential may be between 0 kPa and about 70 kPa, and is preferably between about 6.5 kPa and about 35 kPa. Referring to FIGS. 1 and 2, for example, gas supply 120 comprises fuel, gas supply 130 comprises oxidant, and valves 136 and 126 are adjusted to ensure that oxidant is supplied to stack 102 at a higher pressure than fuel. In addition, in the apparatus of FIG. 2, valve 146 is adjusted to prevent the supply of gas from gas supply 140 to stack 102. Then the voltage across at least one of the fuel cells in the stack is measured. Absent a reactant transfer leak, the fuel cells in the stack will generate a constant voltage dependent on the concentration of reactants in the fuel cell and the load, if any, connected to the fuel cell stack. A reactant transfer leak will introduce oxidant and result in a mixed potential at the anode, which may result in a measurable drop in cell voltage that can be detected by the voltmeter. The cell voltage of a given cell is compared to the cell voltages of other cells in the stack or a reference cell voltage. If the measured cell voltage is significantly less than the comparison cell voltage, then a reactant transfer leak is indicated. A pressure differential in favor of oxidant reduces the risk of thermal damage to leaking fuel cells, as oxidant in the anode compartment will be rapidly oxidized, generating some heat, but typically will not mix and combust with fuel.

In another embodiment for detecting reactant transfer leaks, the method is basically the same as described above, except that a pressure differential in favor of the fuel supplied to the fuel manifold is maintained (in other words, $P_F > P_O$). Thus, referring again to FIGS. 1 and 2, for example, valves 136 and 126 are adjusted to ensure that fuel is supplied to stack 102 at a higher pressure than oxidant. In a similar manner, a reactant transfer leak will introduce fuel and result in a mixed potential at the cathode of the fuel cell, which may produce a measurable drop in fuel cell voltage. A pressure differential in favor of fuel may result in greater sensitivity in transfer leak detection, although care should be taken to minimize the risk of combustion of fuel in the cathode compartment.

In another embodiment of the present method and apparatus for detecting reactant-to-coolant transfer leaks, fuel is supplied to the fuel manifold of the stack at a first pressure ($P_F$), oxidant is supplied to the oxidant manifold at a second pressure ($P_O$), and oxidant or an inert gas is supplied to the coolant manifold at a third pressure ($P_C$), such that a pressure differential in favor of the gas supplied to the coolant manifold is maintained (in other words, $P_C > P_F, P_O$). The pressure differential is preferably below the critical pressure for the fuel cell assemblies in the stack. The critical pressure across a plate may be greater that the critical pressure across a membrane. For example, the pressure differential between the oxidant or inert gas supplied to the coolant manifold and either of the reactants may be between 0 kPa and about 200 kPa, and is preferably between 6.5 kPa and 35 kPa. Referring to FIG. 2, in this embodiment gas supply 120 comprises fuel, gas supply 130 comprises oxidant, gas supply 140 comprises oxidant or an inert gas (for example, nitrogen), and valves 126, 136 and 146 are adjusted to ensure that the gas from gas supply 140 is supplied to stack 102 at a higher pressure than either fuel or oxidant. Then the voltage across at least one of the fuel cells in the stack is measured. Absent a fuel-to-coolant transfer leak, an oxidant-to-coolant transfer leak, or both, the fuel cells in the stack will generate a constant voltage dependent on the concentration of reactants in the fuel cell and the load, if any, connected to the fuel cell stack. Where an inert gas is supplied to the coolant manifold, a fuel-to-coolant transfer leak may introduce inert gas and result in a mixed potential at the anode. Similarly, an oxidant-to-coolant transfer leak may introduce inert gas and result in a mixed potential at the cathode. The mixed potential at the affected electrode may result in a measurable drop in cell voltage that can be detected by the voltmeter. The cell voltage of a given cell is compared to the cell voltages of other cells in the stack or a reference cell voltage. If the measured cell voltage is significantly less than the comparison cell voltage, then a fuel-to-coolant transfer leak or an oxidant-to-coolant transfer leak may be indicated. In this embodiment, it may not be possible to determine whether the indicated transfer leak is a fuel-to-coolant or an oxidant-to-coolant transfer leak, depending on the stack configuration. Nonetheless, the defective fuel cell may still be identified. Alternatively, oxidant may be supplied to the coolant manifold. Fuel-to-coolant transfer leaks may result in a mixed potential and a measurable drop in cell voltage, as described. Conversely, an oxidant-to-coolant transfer leak may result in additional oxidant from the coolant pathways entering the cathode side of the fuel cell. The increase in oxidant may result in an increased cell voltage that may be detected by the voltmeter. Thus, it may be possible to distinguish between fuel-to-coolant and oxidant-to-coolant transfer leaks by the associated drop and increase, respectively, in measured cell voltage.

The reactants may be supplied to the fuel and oxidant manifolds at any suitable pressure desired, however, it is preferable that any pressure differential that may be generated across the MEAs be below the critical pressure. For example, oxidant may be supplied to the stack at a higher pressure than fuel supplied thereto, such that a pressure differential in favor of the oxidant is maintained. The pressure differential may be between 0 kPa and about 70 kPa, and is preferably between about 6.5 kPa and about 35 kPa. Conversely, the same pressure differential may be maintained in favor of fuel. In this manner, it may be possible to detect reactant transfer leaks as well as reactant-to-coolant leaks, as discussed above. Alternatively, it may be desirable to detect reactant transfer leaks and reactant-to-coolant transfer leaks separately. When detecting reactant-to-coolant transfer leaks, the pressure of reactants may be selected to be substantially the same. By substantially equalizing the pressure of the reactants on each side of the MEA, the amount of gas transfer due to a reactant transfer leak may be minimized, thus minimizing or eliminating any corresponding change in cell voltage.

In another embodiment of the present method and apparatus for detecting reactant-to-coolant transfer leaks, the method and apparatus are basically the same as described in the preceding embodiment, except that at least one of the reactants is supplied to the fuel and oxidant manifolds at an elevated pressure substantially equal to or greater than the pressure of oxidant or inert gas supplied to the coolant manifold. The pressure differential between reactants supplied to the fuel and oxidant manifolds should be below the critical pressure for the fuel cells in the stack. For example, the pressure differential may be between 0 kPa and about 70 kPa, and is preferably between about 6.5 kPa and about 35 kPa. Oxidant may be supplied to the oxidant manifold at an elevated pressure (in other words, $P_O \geq P_C > P_F$). Fuel-to-coolant leaks may then be detected as described above. By maintaining the oxidant stream within the stack at an elevated pressure, however, the amount of oxidant or inert gas capable of entering the cathode side of a fuel cell due to an oxidant-to-coolant transfer leak may be minimized. As a result, cell voltage changes due to oxidant-to-coolant transfer leaks may be minimized. Alternatively, fuel may be supplied to the fuel manifold at an elevated pressure (in other words, $P_F > P_C > P_O$). By maintaining the fuel stream within the stack at an elevated pressure the amount of oxidant or inert gas capable of entering the anode side of a fuel cell due to a fuel-to-coolant transfer leak may be minimized. As a result, cell voltage drops due to fuel-to-coolant transfer leaks may be minimized while cell voltage changes due to oxidant-to-coolant transfer leaks may still be detected. Thus, it may be possible to detect fuel-to-coolant and oxidant-to-coolant transfer leaks separately in this manner.

It should be noted that the pressure differential across the membrane may also allow for detection of reactant transfer leaks, as discussed above, and it may not be possible to distinguish between reactant transfer leaks and reactant-to-coolant transfer leaks. On the other hand, the pressure differential across the fuel cell membrane might inhibit the transfer of reactant into the fuel cell from a reactant-to-coolant transfer leak if a reactant transfer leak is also present. As a result, a concurrent reactant transfer leak may affect the change in cell voltage due to the reactant-to-coolant leak, depending on the pressure balance within the affected fuel cell compartment. Thus, it may be possible to infer the presence of such concurrent reactant transfer leaks by comparing the cell voltage measured when at least one of the reactants is at an elevated pressure and when the pressures of both reactants are substantially equalized. A decrease in the magnitude in the former cell voltage relative to the latter may indicate a concurrent reactant transfer leak.

In another preferred embodiment of the present method and apparatus for detecting fuel-to-coolant transfer leaks, fuel is supplied to the coolant manifold of the stack at a first pressure ($P_C$) and oxidant is supplied to the oxidant manifold of the stack at a second pressure ($P_O$). The fuel may be supplied to the coolant manifold at any suitable pressure, although it is preferable that the pressure be chosen so that the effective pressure of fuel in any fuel cells due to a reactant-to-coolant transfer leak does not exceed the critical pressure for the fuel cells in the stack. In order to avoid a potentially damaging pressure differential across the membrane in the absence of a fuel-to-coolant transfer leak, it is also preferable to maintain the pressure of the oxidant stream below the critical pressure. For example, the oxidant stream pressure may be about 70 kPa or less, preferably between about 6.5 kPa and about 35 kPa. Referring to FIG. 2, in this embodiment gas supply 130 comprises oxidant, gas supply 140 comprises fuel, and valve 126 is adjusted to prevent the flow of gas from gas supply 120 to the stack. Then the voltage across at least one of the fuel cells in the stack is measured. Absent a fuel-to-coolant transfer leak, hydrogen will not be supplied to the fuel cells, and no cell voltage will be generated. A fuel-to-coolant transfer leak may result in the presence of hydrogen in the anode side of the fuel cell and an increase in the cell voltage thereof that may be detected by the voltmeter. Thus, a measurable cell voltage may indicate a fuel-to-coolant transfer leak.

In another embodiment of the present method and apparatus for detecting reactant-to-coolant transfer leaks, fuel, oxidant or inert gas is supplied to the fuel manifold of the stack at a first pressure ($P_F$), oxidant is supplied to the oxidant manifold at a second pressure ($P_O$), and fuel is supplied to the coolant manifold at a third pressure ($P_C$), such that a pressure differential in favor of fuel supplied to the coolant manifold is maintained (in other words, $P_C > P_O$, $P_F$). The pressure differential is preferably below the critical pressure for the fuel cells in the stack. For example, the pressure differential between the oxidant or inert gas supplied to the coolant manifold and either of the reactants may be between 0 kPa and about 200 kPa, and is preferably between 6.5 kPa and 35 kPa. Referring to FIG. 2, in this embodiment gas supply 120 comprises fuel, oxidant or inert gas, gas supply 130 comprises oxidant, gas supply 140 comprises fuel, and valves 126, 136 and 146 are adjusted to ensure that the gas from gas supply 140 is supplied to stack 102 at a higher pressure. Then the voltage across at least one of the fuel cells in the stack is measured. The cell voltage of a given cell is compared to the cell voltages of other cells in the stack or a reference cell voltage.

As a first example, oxidant or an inert gas is supplied to the fuel manifold. Absent a fuel-to-coolant transfer leak the fuel cells in the stack will not generate a cell voltage. A fuel-to-coolant transfer leak may result in fuel from the coolant pathways entering the anode side of the fuel cell. The presence of fuel may result in a cell voltage that may be detected by the voltmeter. The gas streams may be supplied to the fuel and oxidant manifolds at any suitably selected pressures. Where a pressure differential is established therebetween, it is preferably below the critical pressure for the fuel cells in the stack.

As a second example, fuel is supplied to the fuel manifold. Absent an oxidant-to-coolant transfer leak, the fuel cells in the stack will generate a constant voltage dependent on the concentration of reactants in the fuel cell and the load, if any, connected to the fuel cell stack. An oxidant-to-coolant transfer leak may introduce fuel and result in a mixed potential at the cathode, which may result in a measurable drop in cell voltage that can be detected by the voltmeter. If the measured cell voltage is significantly less than the comparison cell voltage, then an oxidant-to-coolant transfer leak may be indicated. Thus, it may be possible to detect oxidant-to-coolant transfer leaks by the associated drop in measured cell voltage.

As in the first example, the gas streams may be supplied to the fuel and oxidant manifolds at any suitably selected pressures. Where a pressure differential is established therebetween, it is preferably below the critical pressure for the fuel cells in the stack. In this example, however, the pressure differential across the membrane may also allow for detection of reactant transfer leaks. For a given fuel cell, in most cases it may not be possible to determine whether change in cell voltage is due to a reactant transfer leak or reactant-to-coolant transfer leak. On the other hand, the pressure differential across the fuel cell membrane might inhibit the transfer of fuel into the fuel cell from a reactant-to-coolant transfer leak if a reactant transfer leak is also present. Depending on the pressure balance within the affected fuel cell compartment, the change in cell voltage may be reduced compared to the change that would be expected in the absence of the reactant transfer leak. Thus, it may be possible to infer the presence of such concurrent reactant transfer leaks by comparing the cell voltage measured when at least one of the gas streams is at an elevated pressure and when the pressures of both gas streams are substantially equalized. A change in the former cell voltage relative to the latter may indicate a concurrent reactant transfer leak. Alternatively, it may be desired to detect reactant and reactant-to-coolant transfer leaks separately, in which case the pressures of the gas streams supplied to the fuel and oxidant manifolds are preferably substantially equal.

In another embodiment of the present method and apparatus for detecting reactant-to-coolant transfer leaks, the method and apparatus are basically the same as described in the preceding embodiment, except that one of the gas streams supplied to the fuel and oxidant manifolds is supplied at an elevated pressure substantially equal to or greater than the pressure of fuel gas supplied to the coolant manifold. For example, oxidant may be supplied to the oxidant manifold at an elevated pressure (in other words, $P_O \geq P_C > P_F$). Fuel-to-coolant leaks may then be detected as described. By maintaining the oxidant stream within the stack at an elevated pressure, however, the amount of fuel capable of entering the cathode side of a fuel cell due to an oxidant-to-coolant transfer leak may be minimized. As a result, cell voltage drops due to oxidant-to-coolant transfer leaks may be minimized. Alternatively, fuel (but not oxidant or inert gas) may be supplied to the fuel manifold at an elevated pressure (in other words, $P_F \geq P_C > P_O$). By maintaining the fuel stream within the stack at an elevated pressure the amount of additional fuel capable of entering the anode side of a fuel cell due to a fuel-to-coolant transfer leak may be minimized. As a result, cell voltage increases due to fuel-to-coolant transfer leaks may be minimized while cell voltage drops due to oxidant-to-coolant transfer leaks may still be detected. Thus, it may be possible to detect fuel-to-coolant and oxidant-to-coolant transfer leaks separately in this manner. In addition, the pressure differential across the membrane may also allow for detection of reactant transfer leaks, including concurrent reactant transfer leaks, as discussed in the preceding paragraph.

In another preferred embodiment of the present method and apparatus for detecting oxidant-to-coolant transfer leaks, oxidant is supplied to the coolant manifold of the stack at a first pressure ($P_C$) and fuel is supplied to the fuel manifold of the stack at a second pressure ($P_F$). The oxidant may be supplied to the coolant manifold at any suitable pressure, although it is preferable that the pressure be chosen so that the effective pressure of oxidant in any fuel cells due to a reactant-to-coolant transfer leak does not exceed the critical pressure for the fuel cells in the stack. Referring to FIG. 2, in this embodiment gas supply 120 comprises fuel, gas supply 140 comprises oxidant, and valves 126 and 146 are adjusted to ensure that oxidant from gas supply 140 is supplied to stack 102 at a higher pressure than fuel. In addition, valve 136 is adjusted to prevent the flow of gas from gas supply 130 to the stack. Then the voltage across at least one of the fuel cells in the stack is measured. Absent an oxidant-to-coolant transfer leak, oxidant will not be supplied to the fuel cells, and a small (and possibly diminishing) cell voltage will be generated as oxygen in the air on the cathode side of the fuel cells is consumed. If desired, the oxidant pathways in the stack may be flushed with an inert gas before measuring cell voltage, in which case the fuel cells may still generate a small cell voltage in accordance with the Nernst equation (discussed below). An oxidant-to-coolant transfer leak may result in an increase in the amount of oxidant in the cathode side of the fuel cell and an increase in the cell voltage thereof that may be detected by the voltmeter. Thus, a measurable cell voltage may indicate an oxidant-to-coolant transfer leak.

In order to avoid a potentially damaging pressure differential across the membrane in the absence of an oxidant-to-coolant transfer leak, it is preferable to maintain the pressure of the fuel stream below the critical pressure. For example, the fuel stream pressure may be about 70 kPa or less, preferably between about 6.5 kPa and about 35 kPa. Alternatively, an inert gas may also be supplied to the oxidant manifold of the stack at a third pressure ($P_O$). In this case, the pressure of the oxidant supplied to the coolant manifold should be greater than the pressure of the inert gas stream supplied to the oxidant manifold (in other words, $P_C > P_O$). The pressure of the gas streams supplied to opposite sides of the fuel cells may be at any suitable pressure, and preferably the pressure differential between them is below the critical pressure.

In the foregoing embodiments, transfer leaks are detected by the change in cell voltage in fuel cells operating on fuel and oxidant. Fuel cells may also produce a cell voltage when supplied with fuel alone, according to the Nernst equation:

$$E = (RT/nF) \times \ln(p_1/p_2)$$

where E is the cell voltage, R is the gas constant (8314 J/K·mole), T is temperature (Kelvin), n is electrochemical valence (=2 eqv/mole for hydrogen), F is the Faraday constant (96487 C/eqv), ln is natural logarithm, and $p_1$ and $p_2$ are the partial pressures of hydrogen on each side of the fuel cell membrane. Thus, it may be possible to take advantage of the cell voltage produced according to the Nernst equation to detect transfer leaks.

In another preferred embodiment of the present method and apparatus for detecting reactant transfer leaks, fuel is supplied to the fuel manifold at a first pressure ($P_F$) and an inert gas is supplied to the oxidant manifold at a second pressure ($P_O$) such that such a pressure differential in favor of the fuel manifold is maintained (in other words, $P_F > P_O$). The pressure differential is preferably below the critical pressure for the fuel cells in the stack. For example, the pressure differential may be between 0 kPa and about 70 kPa, and is preferably between about 6.5 kPa and about 35 kPa. Referring to FIGS. 1 and 2, for example, gas supply 120 comprises fuel, gas supply 130 comprises an inert gas, and valves 126 and 136 are adjusted to ensure that fuel is supplied to stack 102 at a higher pressure than the inert gas. In addition, in the apparatus of FIG. 2, valve 146 is adjusted to prevent the supply of gas from gas supply 140 to stack 102. Then the voltage across at least one of the fuel cells in the stack is measured. Absent a reactant transfer leak, the fuel cells in the stack will generate a constant voltage according to the Nernst equation. The magnitude of the cell voltage depends primarily on the hydrogen diffusion characteristics of the fuel cell membrane employed and on the effective volume of the anode and cathode chambers of the fuel cell. A reactant transfer leak may result in an increase in the hydrogen partial pressure on the cathode side of the fuel cell and a decrease in cell voltage that may be detected by the voltmeter. The cell voltage of a given cell is compared to the cell voltages of other cells in the stack or a reference cell voltage. If the measured cell voltage is significantly less than the comparison cell voltage, then a reactant transfer leak is indicated.

In another embodiment of the present method and apparatus for detecting reactant-to-coolant transfer leaks, fuel or an inert gas is supplied to the fuel manifold of the stack at a first pressure ($P_F$), an inert gas is supplied to the oxidant manifold at a second pressure ($P_O$), and fuel is supplied to the coolant manifold at a third pressure ($P_C$), such that a pressure differential in favor of the fuel supplied to the coolant manifold is maintained (in other words, $P_C > P_F, P_O$). The pressure differential is preferably below the critical pressure for the fuel cells in the stack. For example, the pressure differential between the fuel gas and either of the inert gas streams may be between 0 kPa and about 70 kPa, and is preferably between about 6.5 kPa and about 35 kPa. Referring to FIG. 2, in this embodiment gas supply 120 comprises fuel or inert gas, gas supply 130 comprises inert gas, gas supply 140 comprises fuel, and valves 126, 136 and 146 are adjusted to ensure that the fuel gas from supply 140 is supplied to stack 102 at a higher pressure. Then the voltage across at least one of the fuel cells in the stack is measured. The cell voltage of a given cell is compared to the cell voltages of other cells in the stack or a reference cell voltage.

As a first example, inert gas is supplied to the fuel manifold. Absent a fuel-to-coolant transfer leak, an oxidantto-coolant transfer leak, or both, the fuel cells in the stack will not generate a cell voltage. A fuel-to-coolant transfer leak may result in fuel from the coolant pathways entering the anode side of the fuel cell. The presence of fuel may result in a cell voltage that may be detected by the voltmeter. Similarly, an oxidant-to-coolant transfer leak may result in fuel from the coolant pathways entering the cathode side of the fuel cell and a detectable cell voltage. The cell voltages that may be generated by fuel-to-coolant and oxidant-to-coolant transfer leaks will be of opposite signs, thus making it possible to distinguish between them. The gas streams may be supplied to the fuel and oxidant manifolds at any suitably selected pressures. Preferably the pressure differential between them is below the critical pressure for the fuel cells in the stack, and more preferably the pressures are substantially equal.

As a second example, fuel is supplied to the fuel manifold. Absent a fuel-to-coolant transfer leak, an oxidant-to-coolant transfer leak, or both, the fuel cells in the stack will generate a constant voltage according to the Nernst equation. A fuel-to-coolant transfer leak may result in a relative increase in the hydrogen partial pressure on the anode side of the fuel cell and a corresponding increase in cell voltage that may be detected by the voltmeter. Conversely, an oxidant-to-coolant transfer leak may result in a relative increase in the hydrogen partial pressure on the cathode side of the fuel cell and a measurable decrease in cell voltage. Thus, it may be possible to distinguish between fuel-to-coolant and oxidant-to-coolant transfer leaks by the associated increase and drop, respectively, in measured cell voltage.

As in the first example, the gas streams may be supplied to the fuel and oxidant manifolds at any suitably selected pressures. Where a pressure differential is established therebetween, it is preferably below the critical pressure for the fuel cells in the stack. In this example, however, the pressure differential across the membrane may also allow for detection of reactant transfer leaks, as discussed above. In most cases it may not be possible to determine whether a change in cell voltage is due to a reactant transfer leak or reactant-to-coolant transfer leak. On the other hand, the pressure differential across the fuel cell membrane might inhibit the transfer of fuel into the fuel cell from a reactant-to-coolant transfer leak if a reactant transfer leak is also present. Depending on the pressure balance within the affected fuel cell compartment, the change in cell voltage may be reduced compared to the change that would be expected in the absence of the reactant transfer leak. Thus, it may be possible to infer the presence of such concurrent reactant transfer leaks by comparing the cell voltage measured when at least one of the gas streams is at an elevated pressure and when the pressures of both gas streams are substantially equalized. A change in the former cell voltage relative to the latter may indicate a concurrent reactant transfer leak. Alternatively, it may be desired to detect reactant and reactant-to-coolant transfer leaks separately, in which case the pressure of the gas streams supplied to the fuel and oxidant manifolds is preferably substantially equal.

In another embodiment of the present method and apparatus for detecting reactant-to-coolant transfer leaks, the method and apparatus are basically the same as described in the preceding embodiment, except that one of the gas streams is supplied to the fuel or oxidant manifolds at an elevated pressure substantially equal to or greater than the pressure of fuel supplied to the coolant manifold. For example, inert gas may be supplied to the oxidant manifold at an elevated pressure (in other words, $P_O \geq P_C > P_F$). Fuel-to-coolant leaks may then be detected as described above.

By maintaining the oxidant stream within the stack at an elevated pressure, however, the amount of fuel capable of entering the cathode side of a fuel cell due to an oxidant-to-coolant transfer leak may be minimized. As a result, changes in cell voltage due to oxidant-to-coolant transfer leaks may be minimized. Alternatively, fuel or inert gas may be supplied to the fuel manifold at an elevated pressure (in other words, $P_F \geq P_C > P_O$). By maintaining the gas stream supplied to the fuel manifold at an elevated pressure the amount of fuel capable of entering the anode side of a fuel cell due to a fuel-to-coolant transfer leak may be minimized. As a result, changes in cell voltage due to fuel-to-coolant transfer leaks may be minimized while changes in cell voltage due to oxidant-to-coolant transfer leaks may still be detected. Thus, it may be possible to detect fuel-to-coolant and oxidant-to-coolant transfer leaks separately in this manner. In addition, where fuel is supplied to the fuel manifold, the pressure differential across the membrane may also allow for detection of reactant transfer leaks, including concurrent reactant transfer leaks, as discussed in the preceding paragraph.

In another preferred embodiment of the present method and apparatus for detecting reactant-to-coolant transfer leaks, fuel is supplied to the coolant manifold at a first pressure ($P_C$), and an inert gas is supplied to the oxidant manifold of the stack at a second pressure ($P_O$). The fuel may be supplied to the coolant manifold at any suitable pressure, although it is preferable that the pressure be chosen so that the effective pressure of fuel in any fuel cells due to a reactant-to-coolant transfer leak does not exceed the critical pressure. In order to avoid a potentially damaging pressure differential across the membrane in the absence of a fuel-to-coolant transfer leak, it is also preferable to maintain the pressure of the inert gas below the critical pressure. For example, the inert gas pressure may be about 70 kPa or less, preferably between about 6.5 kPa and about 35 kPa. Referring to FIG. 2, in this embodiment gas supply 130 comprises inert gas (for example, nitrogen), gas supply 140 comprises fuel, and valve 126 is adjusted to prevent the supply of gas from gas supply 120 to stack 102. Then the voltage across at least one of the fuel cells in the stack is measured.

Absent a reactant-to-coolant transfer leak the fuel cells in the stack will not generate a cell voltage. The type(s) of transfer leaks detectable in this embodiment depends, in part, on the selected pressure of the inert gas. For example, the inert gas pressure may be selected to be lower than the fuel pressure. A fuel-to-coolant transfer leak may result in fuel from the coolant pathways entering the anode side of the fuel cell. The presence of fuel may result in a cell voltage that may be detected by the voltmeter. Similarly, an oxidant-to-coolant transfer leak may result in fuel from the coolant pathways entering the cathode side of the fuel cell and a detectable cell voltage. The cell voltages that may be generated by fuel-to-coolant and oxidant-to-coolant transfer leaks will be of opposite signs, thus making it possible to distinguish between them. Alternatively, the inert gas may be supplied to the oxidant manifold at an elevated pressure substantially equal to or greater than the pressure of fuel supplied to the coolant manifold. By maintaining the inert gas stream within the stack at an elevated pressure the amount of fuel capable of entering the cathode side of a fuel cell due to an oxidant-to-coolant transfer leak may be minimized. As a result, changes in cell voltage due to oxidant-to-coolant transfer leaks may be minimized while corresponding cell voltage changes due to fuel-to-oxidant leaks may still be detected.

In the foregoing embodiments, the cell voltage of at least one fuel cell in the stack is measured. Preferably, the voltages across a plurality of the fuel cells in the stack are measured, and more preferably the voltage across each of the fuel cells in the stack is measured. The cell voltage(s) may be measured when an external electrical load is connected to the stack. It is preferable, however, to measure the cell voltage at OCV conditions since this may provide a greater range of possible cell voltage values and greater sensitivity in transfer leak detection.

Any of the foregoing embodiments may be combined in order to perform any combination of tests for reactant transfer leaks and reactant-to-coolant transfer leaks, as desired. For example, in the case where the stack has coolant pathways therein, tests are preferably performed for each of reactant transfer leaks, fuel-to-coolant transfer leaks, and oxidant-to-coolant transfer leak. Suitable combinations will be evident to those skilled in the art.

Although the various gas supplies are described in the foregoing embodiments as separate gas sources having independent pressure regulation, other arrangements are also suitable. For example, a single fuel supply may be used to supply fuel to the coolant pathways of the stack and fuel or oxidant manifolds thereof. Any conventional means for providing two gas streams from a single source may be employed. For example, two lines having independent pressure regulation may be employed. As a further example, a three-way valve could be used. Other suitable means will be apparent to persons skilled in the art.

Preferably, the gases are supplied to the stack at a low flow rate. If the gases are supplied at a high flow rate, mixed gases present in a fuel cell due to a transfer leak may be flushed from the fuel cell relatively quickly. This tends to reduce the magnitude of the cell voltage change that may be produced by the transfer leak and may negatively impact the sensitivity of the present method. The appropriate low flow rate depends on such factors as the number of fuel cells in the stack. The appropriate flow rate tends to increase with the number of fuel cells in the stack, and may be easily determined by those skilled in the art.

Where reactant-to-coolant transfer leaks are detected, the location of the leak may affect the ability to locate it. For example, if the leak occurs at or near the inlet ports of the fuel cell, fuel supplied to the coolant manifold may diffuse into the fuel manifold to some extent and enter the reactant compartments of adjacent fuel cells (the size of the transfer leak will also tend to affect the extent of diffusion). As a result, a measurable change in cell voltage may be detectable in at least some of these adjacent fuel cells as well, and it may not be possible to pinpoint the transfer leak. Nonetheless, it is beneficial to locate the leak within a small group of suspect fuel cells. Alternatively, if the leak occurs at or near the outlet ports of the fuel cell, it may be difficult to detect the leak by the present method.

The cell voltage of the fuel cells in the stack may be measured by any conventional means. For example, a voltmeter may be connected across one fuel cell at a time and the cell voltage of each fuel cell tested may be measured. Alternatively, a cell voltage monitor may be employed for simultaneously measuring the cell voltages of a plurality of the fuel cells in the stack. Any proportion of fuel cells in the stack may be tested according to the present method and apparatus. For example, a statistically relevant sample of the fuel cells in the stack may be tested. As another example, the cell voltage of every $n^{th}$ fuel cell in the stack may be measured (for example, every second or third fuel cell).

Figure 3:
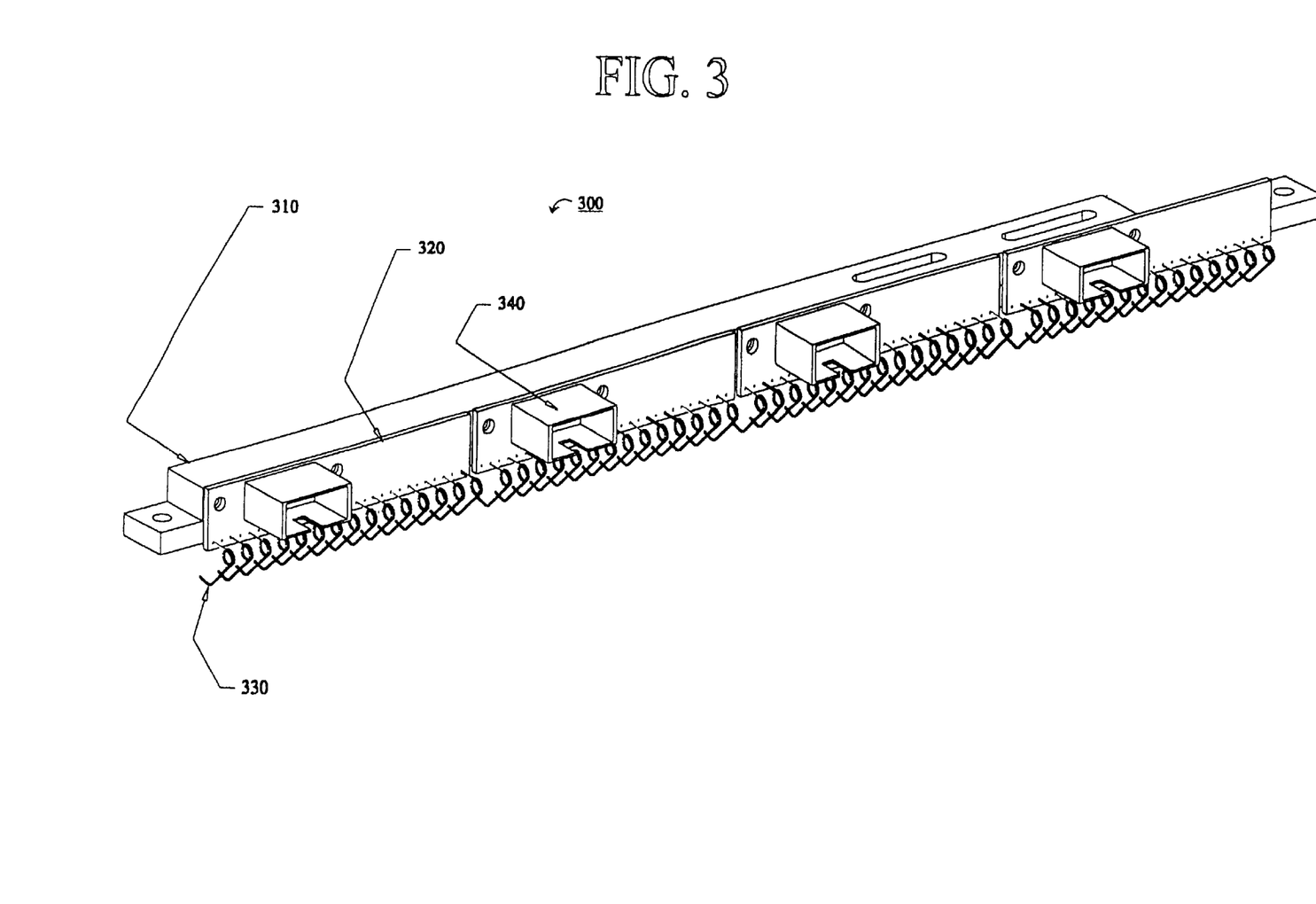
FIG. 3 is an elevation view of a cell voltage monitor according to the present method and apparatus.

FIG. 3 is a view of a cell voltage monitor according to the present method and apparatus. Cell voltage monitor ("CVM") 300 comprises contact rail 310 for removably attaching CVM 300 to the fuel cell stack. Preferably, the stack is also adapted to removably receive the cell voltage monitor. Attached to rail 310 are contact boards 320 and contact springs 330. Contact springs 330 are electrically connected to the associated contact board 320 and are adapted to make electrical connection with the fuel cells in the stack. (The number of springs 330 shown in FIG. 3 has been reduced for clarity). Connectors 340 are electrically connected to the associated contact springs 330 via contact boards 320 and are adapted to receive ribbon cables (not shown). CVM 300 generates output signals representative of the cell voltage of each fuel cell in the stack. The ribbon cables connected to connectors 340 may be connected to a controller for receiving the output signals and signaling when a transfer leak has been detected. Preferably, the controller comprises a display for displaying the measured cell voltages for the fuel cells in the stack.

The following example is for purposes of illustration and is not intended to limit the invention.

EXAMPLE 1

Substantially pure hydrogen was supplied to the fuel inlet manifold of a Ballard Mark 5 fuel cell stack at a flow rate of 100 SLPM and at 0.30 barg pressure. Similarly, air was supplied to the oxidant inlet manifold of the stack at a flow rate of 150 SLPM and at 0.15 barg pressure. Reactants exited the stack via the associated outlet manifolds. A cell voltage monitor similar to the cell voltage monitor shown in FIG. 3 was connected to the stack in order to measure the voltage of each fuel cell in the stack.

Figure 4:
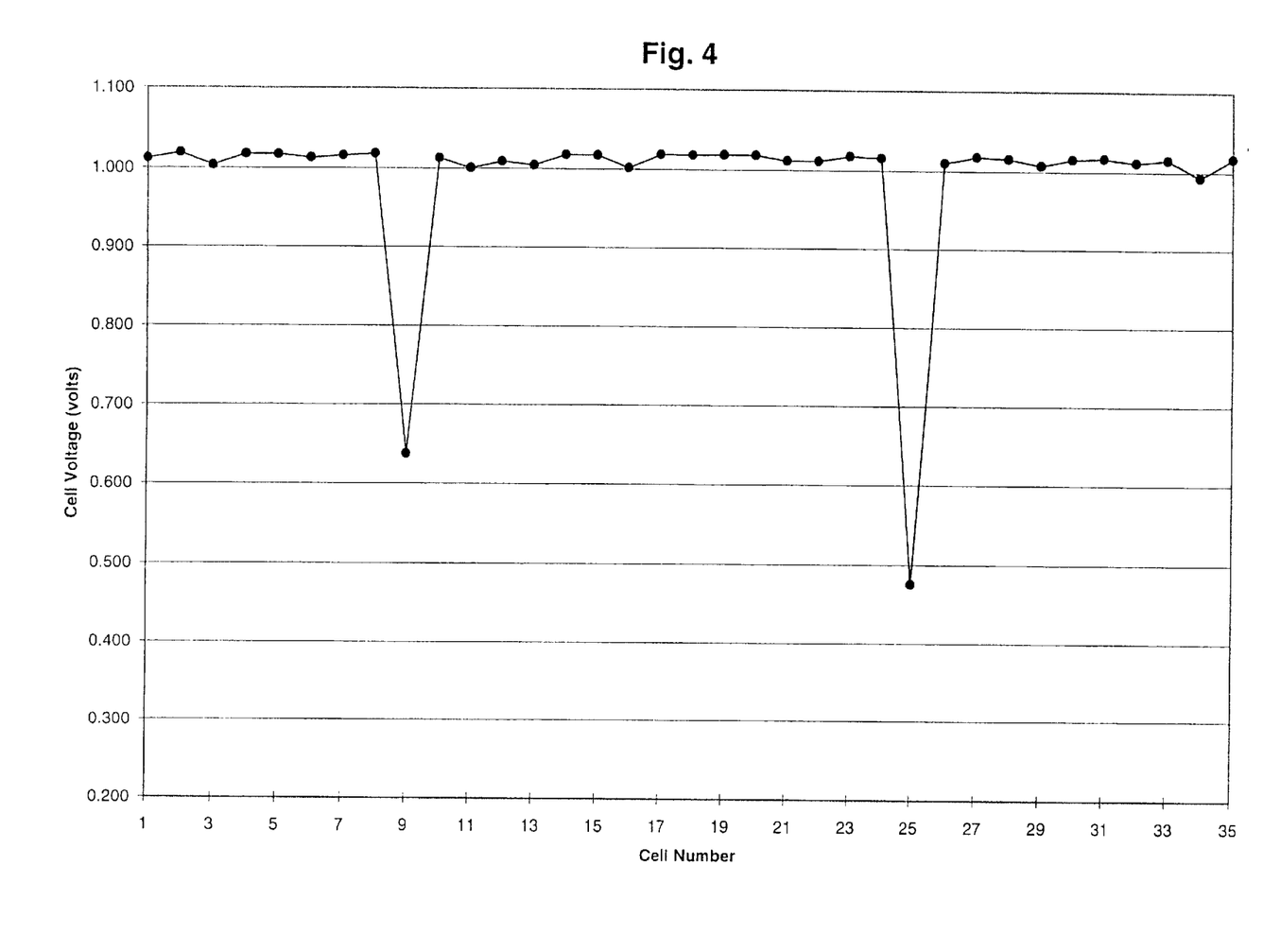
FIG. 4 is a graph of cell voltage for fuel cells in a stack.

FIG. 4 is a representative illustration of the display output for the results of the transfer leak test for the first 35 cells in the stack. A cell voltage of about 1 volt is typical for fuel cells, absent a reactant transfer leak. The low cell voltage values for cells 9 and 25, conversely, indicate the likely presence of a reactant transfer leak. As indicated in FIG. 4, the present method and apparatus allow identification of transfer leaks in affected fuel cells.

While particular elements, embodiments and applications of the present invention have been shown and described, it will be understood, of course, that the invention is not limited thereto since modifications may be made by those skilled in the art, particularly in light of the foregoing teachings. It is therefore contemplated that the appended claims cover such modifications as incorporate those features which come within the scope of the invention.

What is claimed is:

1. A method of detecting transfer leaks within a fuel cell stack, said stack comprising:
    a plurality of solid polymer electrolyte fuel cell assemblies,
    at least one fuel manifold fluidly connected to said plurality of fuel cell assemblies, and
    at least one oxidant manifold fluidly connected to said plurality of fuel cell assemblies,
    the method consisting essentially of:
        (a) supplying fuel to said at least one fuel manifold at a first pressure;
        (b) supplying an inert gas to said at least one oxidant manifold at a second pressure lower than said first pressure; and
        (c) measuring the voltage across at least one of said plurality of fuel cell assemblies.

2. The method of claim 1 wherein said inert gas is selected from the group consisting of nitrogen, argon, helium, and carbon dioxide.

3. A method of detecting transfer leaks within a fuel cell stack, said stack comprising
- a plurality of fuel cell assemblies each comprising a membrane electrode assembly comprising an anode, a cathode, and an ion exchange membrane interposed therebetween,
- coolant stream passages in thermal communication with at least a portion of said fuel cell assemblies,
- at least one fuel manifold fluidly connected to said plurality of fuel cell assemblies,
- at least one oxidant manifold fluidly connected to said plurality of fuel cell assemblies, and
- at least one coolant manifold fluidly connected to said coolant stream passages, the method comprising:
  - (a) supplying fuel to said at least one fuel manifold at a first pressure;
  - (b) supplying oxidant to said at least one oxidant manifold at a second pressure;
  - (c) supplying a gas to said at least one coolant manifold at a third pressure; and
  - (d) measuring the voltage across at least one of said plurality of fuel cell assemblies,
    - wherein said gas supplied to said at least one coolant manifold is selected from the group consisting of oxidant and an inert gas, and wherein said third pressure is greater than at least one of said first and second pressures.

4. The method of claim 3 wherein said third pressure is greater than both of said first and second pressures.

5. The method of claim 3 wherein said first pressure is greater than or equal to said third pressure.

6. The method of claim 3 wherein said second pressure is greater than or equal to said third pressure.

7. The method claim 3 wherein said gas supplied to said at least one coolant manifold is oxidant.

8. The method of claim 3 wherein said gas supplied to said at least one coolant manifold is an inert gas selected from the group consisting of nitrogen, argon, helium, and carbon dioxide.

9. A method of detecting transfer leaks within a fuel cell stack, said stack comprising
- a plurality of fuel cell assemblies each comprising a membrane electrode assembly comprising an anode, a cathode, and an ion exchange membrane interposed therebetween,
- coolant stream passages in thermal communication with at least a portion of said fuel cell assemblies,
- at least one fuel manifold fluidly connected to said plurality of fuel cell assemblies,
- at least one oxidant manifold fluidly connected to said plurality of fuel cell assemblies, and
- at least one coolant manifold fluidly connected to said coolant stream passages,
- the method comprising:
  - (a) supplying oxidant to said at least one oxidant manifold at a first pressure;
  - (b) supplying a gas to said at least one fuel manifold at a second pressure;
  - (c) supplying fuel to said at least one coolant manifold at a third pressure; and
  - (d) measuring the voltage across at least one of said plurality of fuel cell assemblies,
    - wherein said gas supplied to said at least one fuel manifold is selected from the group consisting of fuel, oxidant and an inert gas, and wherein said third pressure is greater than at least one of said first and second pressures.

10. The method of claim 9 wherein said third pressure is greater than both of said first and second pressures.

11. The method of claim 9 wherein said first pressure is greater than or equal to said third pressure.

12. The method of claim 9 wherein said gas supplied to said at least one fuel manifold is oxidant.

13. The method of claim 9 wherein said gas supplied to said at least one fuel manifold is an inert gas selected from the group consisting of nitrogen, argon, helium, and carbon dioxide.

14. The method of claim 9 wherein said gas supplied to said at least one fuel manifold is a fuel.

15. The method of claim 14 wherein said second pressure is greater than or equal to said third pressure.

16. A method of detecting transfer leaks within a fuel cell stack, said stack comprising
- a plurality of fuel cell assemblies each comprising a membrane electrode assembly comprising an anode, a cathode, and an ion exchange membrane interposed therebetween,
- coolant stream passages in thermal communication with at least a portion of said fuel cell assemblies,
- at least one fuel manifold fluidly connected to said plurality of fuel cell assemblies,
- at least one oxidant manifold fluidly connected to said plurality of fuel cell assemblies, and
- at least one coolant manifold fluidly connected to said coolant stream passages, the method comprising:
  - (a) supplying a first gas to said at least one oxidant manifold at a first pressure;
  - (b) supplying a second gas to said at least one fuel manifold at a second pressure;
  - (c) supplying fuel to said at least one coolant manifold at a third pressure; and
  - (d) measuring the voltage across at least one of said plurality of fuel cell assemblies,
    - wherein said first gas is an inert gas and said second gas is selected from the group consisting of a fuel and an inert gas, and wherein said third pressure is greater than at least one of said first and second pressures.

17. The method of claim 16 wherein said third pressure is greater than both of said first and second pressures.

18. The method of claim 16 wherein said first pressure is greater than or equal to said third pressure.

19. The method of claim 16 wherein said second pressure is greater than or equal to said third pressure.

20. The method of claim 16 wherein said second gas is a fuel.

21. The method of claim 16 wherein said second gas is an inert gas selected from the group consisting of nitrogen, argon, helium, and carbon dioxide.

22. A method of detecting transfer leaks within a fuel cell stack, said stack comprising
- a plurality of fuel cell assemblies each comprising a membrane electrode assembly comprising an anode, a cathode, and an ion exchange membrane interposed therebetween,
- coolant stream passages in thermal communication with at least a portion of said fuel cell assemblies,
- at least one fuel manifold fluidly connected to said plurality of fuel cell assemblies,
- at least one oxidant manifold fluidly connected to said plurality of fuel cell assemblies, and at least one coolant manifold fluidly connected to said coolant stream passages, the method comprising:
(a) supplying an inert gas to said at least one oxidant manifold at a first pressure;
(b) supplying fuel to said at least one fuel manifold at a second pressure;
(c) supplying oxidant to said at least one coolant manifold at a third pressure; and
(d) measuring the voltage across at least one of said plurality of fuel cell assemblies,
wherein said third pressure is greater than at least one of said first and second pressures.

23. The method of claim 22 wherein said third pressure is greater than both of said first and second pressures.

24. The method of claim 22 wherein said first pressure is greater than or equal to said third pressure.

25. The method of claim 22 wherein said second pressure is greater than or equal to said third pressure.

26. The method of any of claims 3, 9, 16 and 22, wherein the pressure differential between said first and second pressures is from 0 kPa to about 200 kPa.

27. The method of any of claims 3, 9, 16 and 22, wherein the pressure differential between said first and second pressures is from about 6.5 kPa to about 35 kPa.

28. A method of detecting transfer leaks within a fuel cell stack, said stack comprising
a plurality of fuel cell assemblies each comprising a membrane electrode assembly comprising an anode, a cathode, and an ion exchange membrane interposed therebetween,
coolant stream passages in thermal communication with at least a portion of said fuel cell assemblies,
at least one fuel manifold fluidly connected to said plurality of fuel cell assemblies,
at least one oxidant manifold fluidly connected to said plurality of fuel cell assemblies, and
at least one coolant manifold fluidly connected to said coolant stream passages, the method comprising:
(a) supplying fuel to said at least one coolant manifold at a first pressure;
(b) supplying a gas to said at least one oxidant manifold at a second pressure; and
(c) measuring the voltage across at least one of said plurality of fuel cell assemblies,
wherein said gas supplied to said at least one oxidant manifold is selected from the group consisting of oxidant and an inert gas.

29. The method of claim 28 wherein said first pressure is greater than or equal to said second pressure.

30. The method of claim 28 wherein said gas supplied to said at least one oxidant manifold is oxidant.

31. The method of claim 28 wherein said gas supplied to said at least one oxidant manifold is an inert gas selected from the group consisting of nitrogen, argon, helium, and carbon dioxide.

32. A method of detecting transfer leaks within a fuel cell stack, said stack comprising
a plurality of fuel cell assemblies each comprising a membrane electrode assembly comprising an anode, a cathode, and an ion exchange membrane interposed therebetween,
coolant stream passages in thermal communication with at least a portion of said fuel cell assemblies,
at least one fuel manifold fluidly connected to said plurality of fuel cell assemblies,
at least one oxidant manifold fluidly connected to said plurality of fuel cell assemblies, and
at least one coolant manifold fluidly connected to said coolant stream passages,
the method comprising:
(a) supplying oxidant to said at least one coolant manifold at a first pressure;
(b) supplying fuel to said at least one fuel manifold at a second pressure; and
(c) measuring the voltage across at least one of said plurality of fuel cell assemblies.

33. The method of claim 32 wherein said first pressure is greater than or equal to said second pressure.

34. The method of any of claims 1, 3, 9, 16, 22, 28, and 32, wherein said stack is operating at open circuit voltage.

35. The method of any of claims 1, 3, 9, 16, 22, 28, and 32, further comprising comparing said measured voltage with a reference voltage.

* * * * *